(12) United States Patent
Shriver et al.

(10) Patent No.: US 10,800,351 B2
(45) Date of Patent: Oct. 13, 2020

(54) ROOF DITCH SEALING ASSEMBLIES FOR VEHICLES AND METHODS FOR SEALING ROOF DITCHES

(71) Applicant: Toyota Motor Engineering & Manufacturing North America, Inc., Plano, TX (US)

(72) Inventors: Daniel G. Shriver, Ann Arbor, MI (US); Prasanth Mohankumar, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 60 days.

(21) Appl. No.: 16/290,257

(22) Filed: Mar. 1, 2019

(65) Prior Publication Data
US 2020/0276940 A1   Sep. 3, 2020

(51) Int. Cl.
| | |
|---|---|
| *B62D 25/07* | (2006.01) |
| *B62D 27/02* | (2006.01) |
| *B60R 13/04* | (2006.01) |
| *B60R 13/06* | (2006.01) |

(52) U.S. Cl.
CPC .............. *B60R 13/06* (2013.01); *B60R 13/04* (2013.01); *B62D 25/07* (2013.01); *B62D 27/026* (2013.01)

(58) Field of Classification Search
CPC ......... B60R 13/04; B60R 13/06; B60R 13/07; B62D 25/02; B62D 25/06; B62D 25/07; B62D 27/026; B60J 10/30; B60J 10/34; B60J 10/345; B60J 10/36; B60J 10/40; F16B 5/12; F16B 5/123; F16B 5/125; F16B 5/126; F16B 5/128
USPC ................................. 296/210, 93, 213, 1.08
See application file for complete search history.

(56) References Cited

U.S. PATENT DOCUMENTS

| | | | |
|---|---|---|---|
| 7,029,060 B1 | 4/2006 | Osterberg et al. | |
| 7,004,535 B1 | 8/2006 | Osterberg et al. | |
| 7,452,022 B2 | 11/2008 | Sato et al. | |
| 8,020,354 B2 | 9/2011 | Scroggie et al. | |
| 8,205,923 B2 | 6/2012 | Mourou | |
| 8,979,181 B2 | 3/2015 | Slack et al. | |
| 9,168,878 B2 | 10/2015 | Bozinovski | |
| 2002/0011308 A1* | 1/2002 | Johnson | B32B 27/32 156/303.1 |
| 2005/0212318 A1* | 9/2005 | Hui | B60R 13/04 296/29 |
| 2007/0182214 A1* | 8/2007 | Okabe | B60R 13/04 296/210 |
| 2008/0073924 A1* | 3/2008 | Sakamoto | B60R 13/04 296/1.08 |

(Continued)

*Primary Examiner* — Gregory A Blankenship
(74) *Attorney, Agent, or Firm* — Dinsmore & Shohl LLP (57) ABSTRACT

A vehicle includes a roof assembly including a roof having an outer facing surface and a roof ditch that extends below the outer facing surface. The roof ditch extends in a vehicle longitudinal direction between a front windshield and a rear window. A rear roof ditch molding is located at least partially within the roof ditch at a rear portion of the roof ditch. A cured roof ditch sealer extends along a front portion of the roof ditch and rearward in the vehicle longitudinal direction toward the rear roof ditch molding. A roof ditch sealer dam is located between a rear end of the cured roof ditch sealer and a front end of the rear roof ditch molding.

12 Claims, 6 Drawing Sheets

(56) References Cited

U.S. PATENT DOCUMENTS

| | | | |
|---|---|---|---|
| 2008/0226866 A1* | 9/2008 | Vilcek | B60R 13/06 |
| | | | 428/99 |
| 2010/0180536 A1* | 7/2010 | Reznar | F16B 5/125 |
| | | | 52/716.7 |
| 2014/0217783 A1* | 8/2014 | Hida | B62D 27/026 |
| | | | 296/210 |
| 2019/0032383 A1* | 1/2019 | Wilks | E05D 11/0054 |
| 2019/0232890 A1* | 8/2019 | Nydam | B60R 13/06 |
| 2020/0139901 A1* | 5/2020 | Kowal | F16B 21/08 |

* cited by examiner

ROOF DITCH SEALING ASSEMBLIES FOR VEHICLES AND METHODS FOR SEALING ROOF DITCHES

TECHNICAL FIELD

The present specification generally relates to vehicle roofs and, more specifically, to roof ditch sealing assemblies for vehicle roofs and methods for sealing roof ditches.

BACKGROUND

Many vehicles include vehicle roofs that are welded to side panels of the vehicles. In order to facilitate welding, the vehicle roofs may be provided with a roof ditch that runs lengthwise along the vehicle roofs, between the vehicle roofs and the side panels of the vehicles. After welding the roofs to the side panels, the roof ditches may be filled with a sealer and/or preformed molding. The sealer may be in a liquid form and may tend to run lengthwise along the roof ditches. Such running of the sealer may be particularly pronounced for curved roofs and create inconsistent end portions. For example, as sealers are poured into the roof ditches and then allowed to cure, the ambient environment can affect the cure of the sealer leading to an inconsistent length and formation of gaps between the sealer and adjacent moldings. Moldings, while being solid and having relatively unchanging lengths, tend to be relatively expensive, require preforming and then assembly to the roof ditches. Further, moldings may require fasteners that anchor to the vehicle roofs, which can provide an access point for water to enter an interior of the vehicle.

What is needed are roof ditch sealing assemblies that include a combination roof ditch sealer dam and molding clip that both clips to a rear roof ditch molding of a roof assembly at the roof ditch and provides a dam that forms an end stop for the sealer to inhibit formation of a gap between the end of the sealer and the rear roof ditch molding.

SUMMARY

In accordance with one embodiment, a vehicle includes a roof assembly including a roof having an outer facing surface and a roof ditch that extends below the outer facing surface. The roof ditch extends in a vehicle longitudinal direction between a front windshield and a rear window. A rear roof ditch molding is located at least partially within the roof ditch at a rear portion of the roof ditch. A cured roof ditch sealer extends along a front portion of the roof ditch and rearward in the vehicle longitudinal direction toward the rear roof ditch molding. A roof ditch sealer dam is located between a rear end of the cured roof ditch sealer and a front end of the rear roof ditch molding.

In another embodiment, a method of filling a roof ditch of a vehicle roof assembly is provided. The method includes positioning a combination roof ditch sealer dam and molding clip within the roof ditch. The combination roof ditch sealer dam and molding clip includes a roof ditch sealer dam. A rear roof ditch molding is interconnected with the combination roof ditch sealer dam and molding clip. A roof ditch sealer is applied in the roof ditch. The roof ditch sealer dam provides an end stop for a rear end of the roof ditch sealer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. The cabins are formed by side panels and a roof assembly that is connected to the side panels at opposite sides of the roof assembly. The roof assembly includes a vehicle roof that is connected to one side panel along a roof ditch that extends lengthwise from a front of the vehicle roof to a rear to the vehicle roof. The vehicle roof is also connected to another side panel along another roof ditch that extends lengthwise from the front of the vehicle roof to the rear of the vehicle roof.

A rear roof ditch molding is located at least partially within the roof ditch at a rear portion of the vehicle. The rear roof ditch molding is preformed and then installed into the roof ditch. A cured roof ditch sealer extends along a front portion of the roof ditch and from the front of the vehicle toward the rear roof ditch molding. A combination roof ditch sealer dam and molding clip is located at least partially between the rear roof ditch molding and the roof ditch sealer. The combination roof ditch sealer dam and molding clip includes a roof ditch molding clip that connects with the rear roof ditch molding and a roof ditch sealer dam that abuts the roof ditch sealer. The roof ditch sealer dam extends vertically away from the vehicle roof and into a space between the roof ditch sealer and the rear roof ditch molding.

Figure 1:
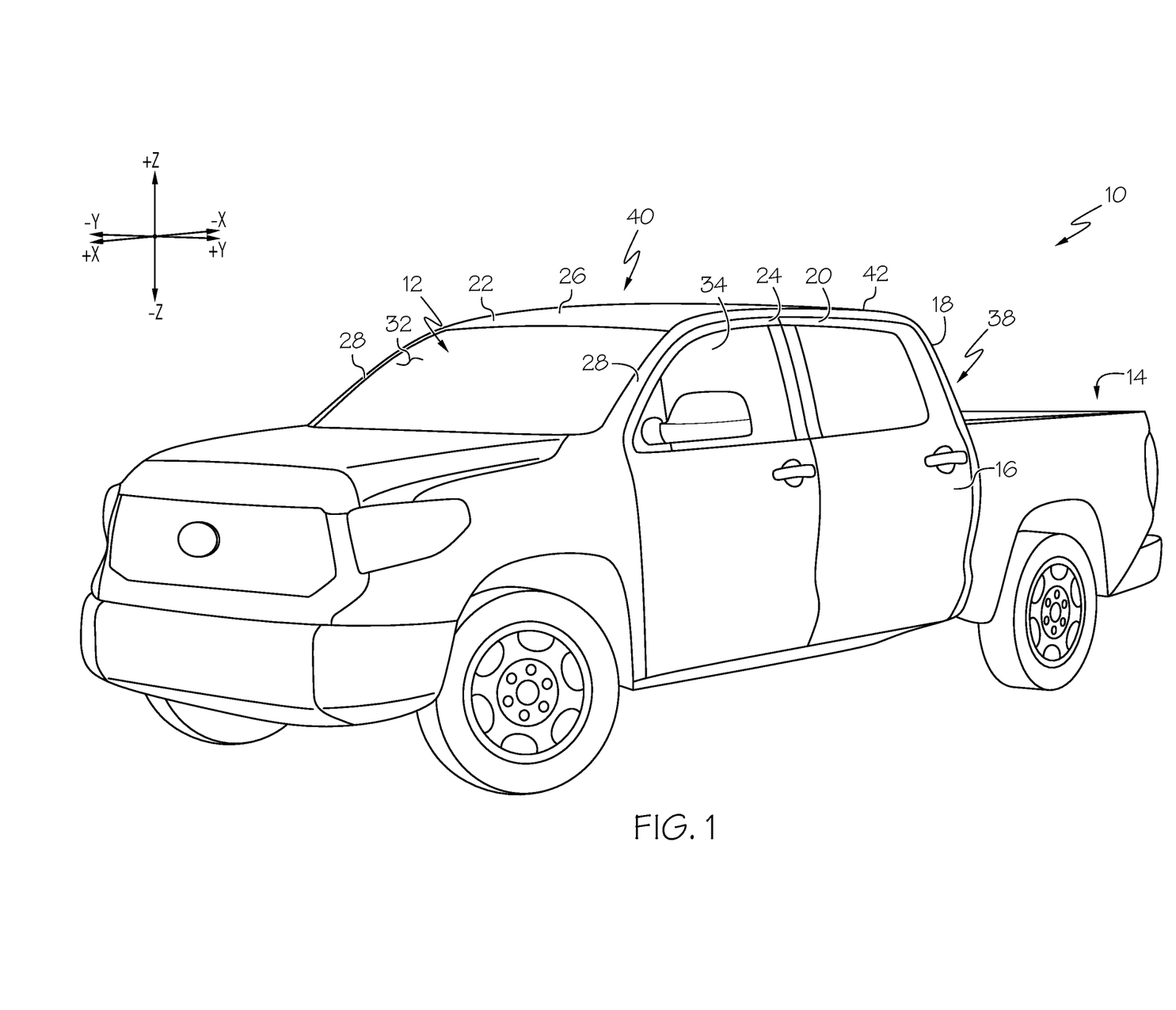
FIG. 1 depicts a front perspective view of a pickup truck, according to one or more embodiments shown and described herein.

As used herein, the term "vehicle longitudinal direction" refers to the forward-rearward direction of the pickup truck (i.e., in the +/−vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Referring to FIG. 1, a pickup truck is generally illustrated at 10. The pickup truck 10 includes a passenger cabin 12 and a truck bed 14. The pickup truck 10 includes a vehicle body including a body framework 18 that includes a pair of side panels 20 and 22 with side roof rail structures 24 and 26 and front pillars 28. The front pillars 28 are connected to the side roof rail structures 24 and 26 and extend downwardly therefrom in the vehicle vertical direction. The front pillars 28 are located toward a forward end of the vehicle 10, generally between a front windshield 32 and front side windows 34.

The vehicle 10 includes a vehicle roof assembly 40 including a vehicle roof 42 that extends in the vehicle lateral direction between the side roof rail structures 24 and 26 and in the vehicle longitudinal direction between the front windshield 32 and a rear window 38. While only an outer vehicle panel is illustrated, the vehicle roof 42 may be formed of multiple panels, such as an inner vehicle panel that is connected to the outer vehicle panel. Further, the vehicle roof assembly 40 may include a headliner that can form an interior panel of the vehicle roof assembly 40 that can be viewed from within the cabin 12 of the vehicle 10. The headliner can also cover at least portions of the remaining vehicle roof assembly 40 from view from within the cabin 12.

Figure 2:
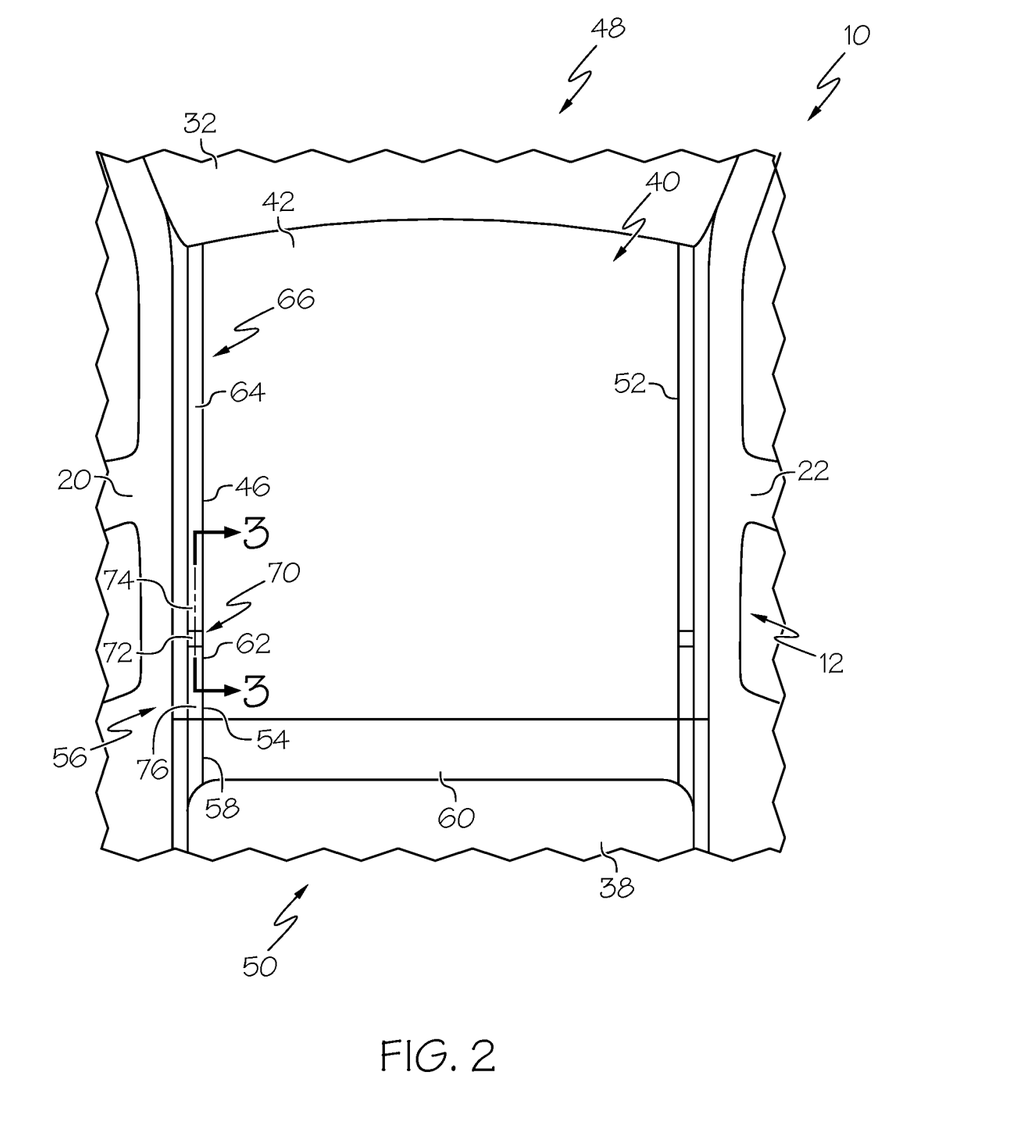
FIG. 2 schematically depicts a top of the pickup truck of FIG. 1 illustrating a roof assembly, according to one or more embodiments shown and described herein.

Referring to FIG. 2, a diagrammatic top view of the pickup truck 10 is illustrated including the side panels 20 and 22 and the vehicle roof assembly 40. The vehicle roof assembly 40 includes the vehicle roof 42 that is connected to one side panel 20 along a roof ditch 46 that extends lengthwise between the front windshield 32 of the vehicle roof 42 and the rear window 38 of the vehicle roof 42. The vehicle roof 42 is also connected to another side panel 22 along another roof ditch 52 that extends lengthwise from the front 48 of the vehicle roof 42 to the rear 50 of the vehicle roof 42.

A rear roof ditch molding 54 is located at least partially within the roof ditch 46 at a rear portion 56 of the roof ditch 46. The rear roof ditch molding 54 is preformed and then installed into the roof ditch 46. The rear roof ditch molding 54 has a rear portion 58 that extends along a rear wall 60 of the passenger cabin 12 and a roof portion 62 that extends along the vehicle roof 42. A cured roof ditch sealer 64 extends along a front portion 66 of the roof ditch 46. The cured roof ditch sealer 64 may be, for example, a PVC based body sealer with select additives for UV/Mold protection. A combination roof ditch sealer dam and molding clip 70 is located at least partially between the rear roof ditch molding 54 and the roof ditch sealer 64. In particular, the combination roof ditch sealer dam and molding clip 70 includes a roof ditch sealer dam 72 located between a rear end 74 of the roof ditch sealer 64 and a front end 76 of the rear roof ditch molding 54. As will be described in greater detail below, the roof ditch sealer dam 72 inhibits overlap between the roof ditch sealer 64 and rear roof ditch molding 54 and provides a stop surface 78 (FIG. 3) against which the roof ditch sealer 64 can abut to reduce any gap formation between the rear roof ditch molding 54 and the roof ditch sealer 64 in a reliable fashion.

Figure 3:
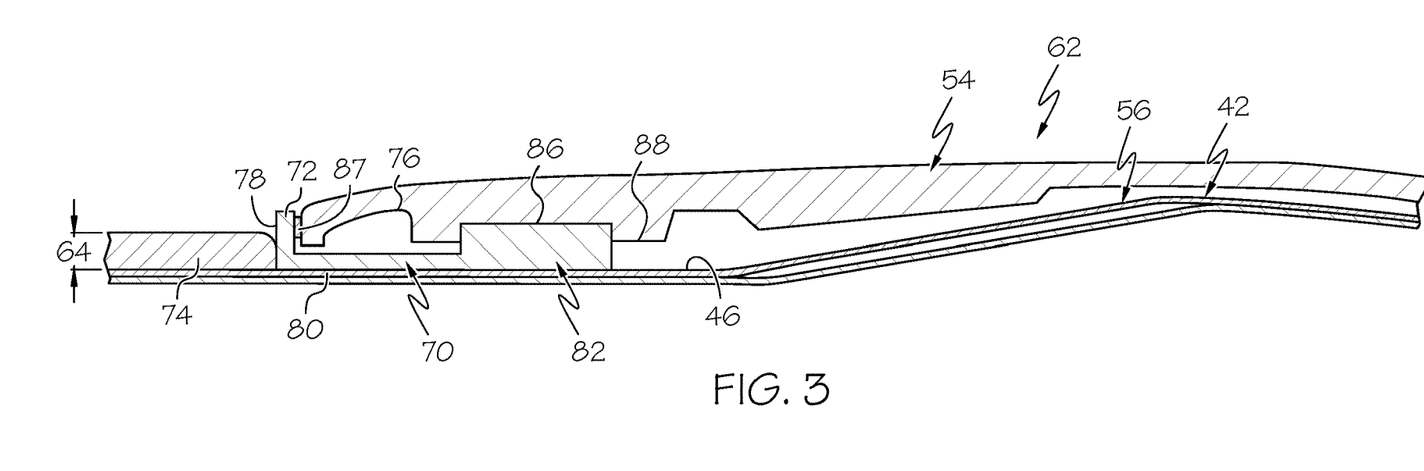
FIG. 3 schematically depicts a section view of the roof assembly along lines 3-3 of FIG. 2, according to one or more embodiments shown and described herein.

Referring to FIG. 3, a section of the interface between the combination roof ditch sealer dam and molding clip 70, the rear roof ditch molding 54 and the roof ditch sealer 64 is illustrated diagrammatically in section. The vehicle roof 42 includes the roof ditch 46. The rear roof ditch molding 54 is located within the roof ditch 46 at the rear portion 56 of the roof ditch 46. The rear roof ditch molding 54 has the roof portion 62 that extends forward along the vehicle roof 42 and terminates at the front end 76. The roof ditch sealer 64 is also located within the roof ditch 46 and extends rearward and terminates at the rear end 74. The combination roof ditch sealer dam and molding clip 70 is partially located between the front end 76 of the rear roof ditch molding and the rear end 74 of the roof ditch sealer 64.

Figure 4:
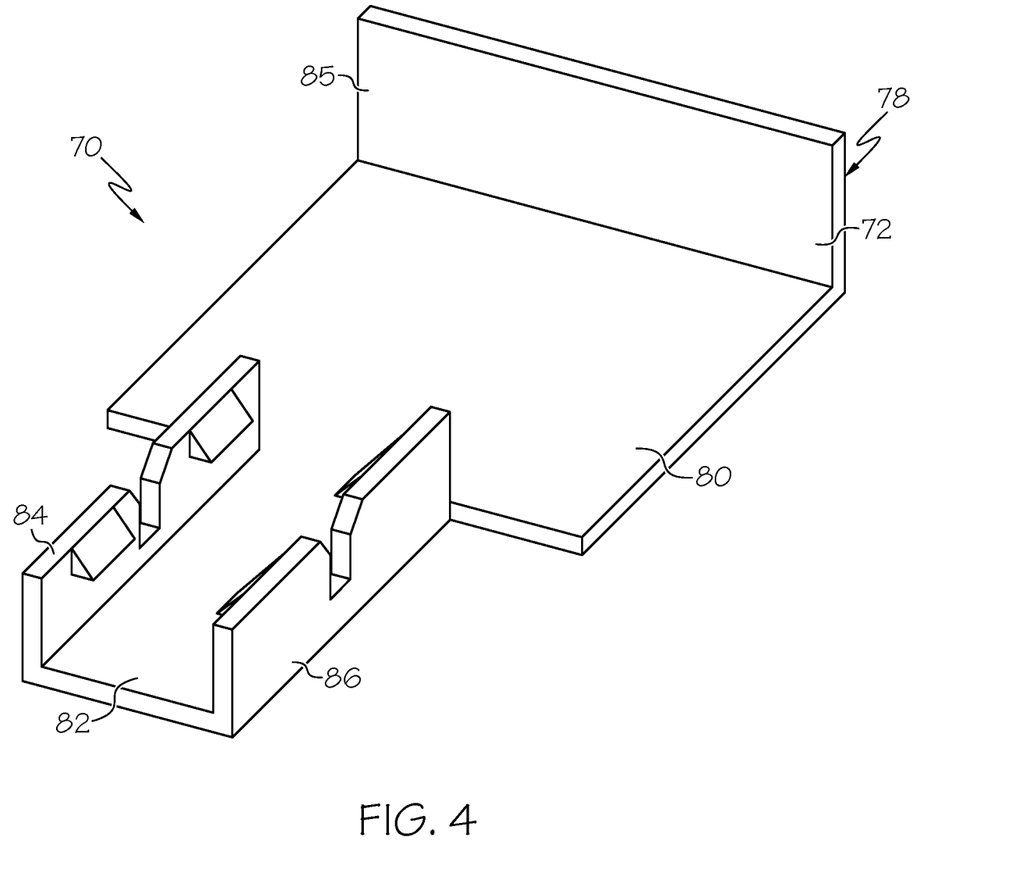
FIG. 4 schematically depicts a perspective view of a combination roof ditch sealer dam and molding clip.
Figure 5:
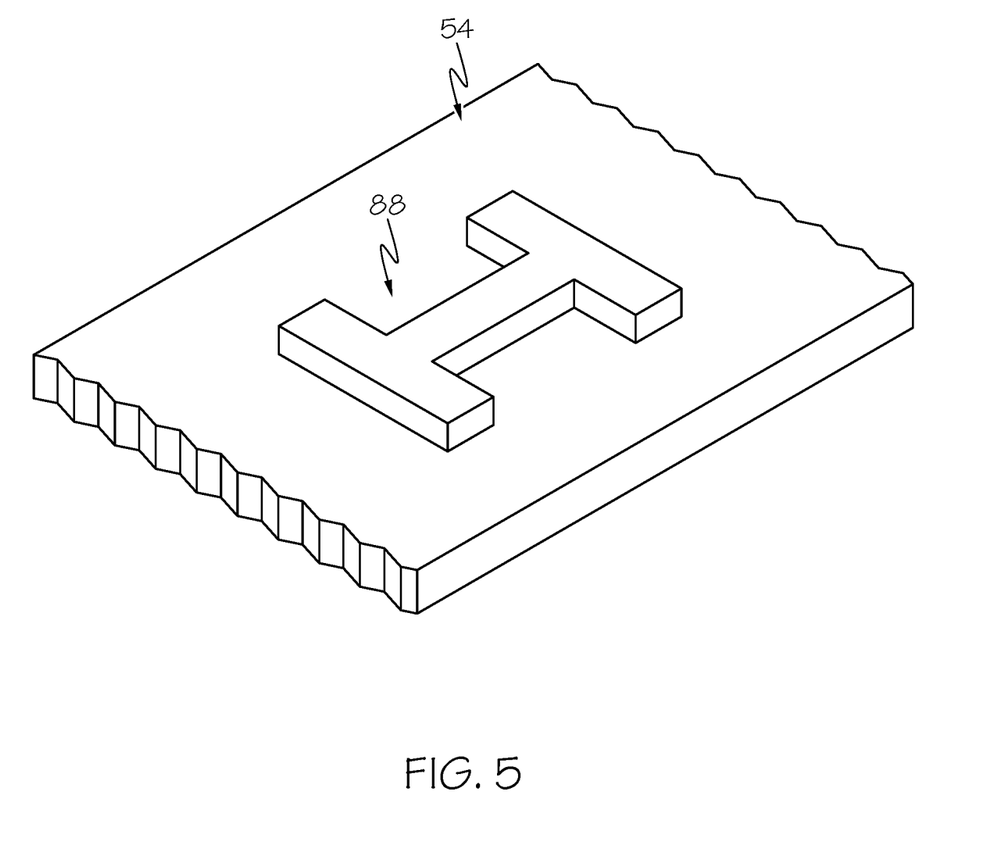
FIG. 5 illustrates a bottom view of a rear roof ditch molding that interconnects with the combination roof ditch sealer dam and molding clip of FIG. 4, according to one or more embodiments shown and described herein.

Referring also to FIG. 4, which shows the combination roof ditch sealer dam and molding clip 70 in isolation, the combination roof ditch sealer dam and molding clip 70 includes a base 80, the roof ditch sealer dam 72 that extends outwardly from the base 80 in the vehicle vertical direction and a molding clip 82 that extends outwardly from the base 80 in the vehicle longitudinal direction. The roof ditch sealer dam 72 may include a dam wall 85 that extends orthogonally outward at a front side of the base 80 to provide the stop surface 78 against which the rear end 74 can abut during a curing process. The base 80 may be flat in order to be located beneath the rear roof ditch molding 54. The molding clip 82 extends rearward from the base 80 and includes a pair of clip members 84 and 86 that engage the rear roof ditch molding 54. In particular, referring briefly to FIG. 5, the clip members 84 and 86 may extend outward in the vehicle vertical direction to engage an I-shaped clip engagement projection 88 located on a bottom of the rear roof ditch molding 54. The clip engagement projection 88 may be formed as a monolithic part of the rear roof ditch molding 54 during a molding process and be arranged such that, when engaged with the molding clip 82, the dam wall 85 is located adjacent the front end 76 of the rear roof ditch molding 54. In some embodiments, a compressible member 87 (e.g., a sponge) may be placed between the dam wall 85 and the front end 76 of the rear roof ditch molding 54.

Figure 6:
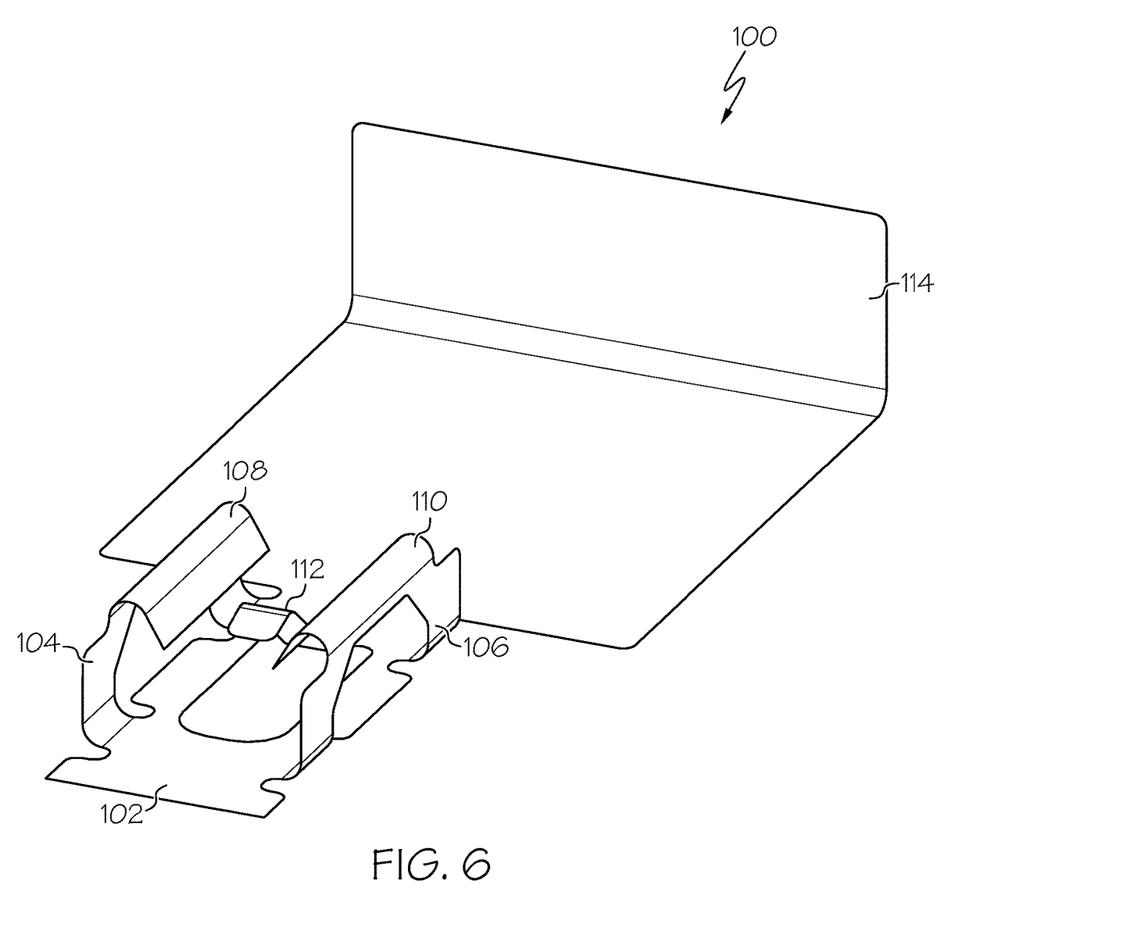
FIG. 6 schematically depicts another embodiment of a combination roof ditch sealer dam and molding clip, according to one or more embodiments shown and described herein.

FIG. 6 illustrates another embodiment of a combination roof ditch sealer dam and molding clip 100 that includes a molding clip 102 with clip members 104 and 106. In this embodiment, the clip members 104 and 106 are hook-shaped and have curved head portions 108 and 110, unlike the clip members 84 and 86, which are planar. The curved head portions 108 and 110 may be used to engage a clip engagement projection of a rear roof ditch molding. The molding clip 102 may further include a centering clip member 112 that can be used to further engage the clip engagement projection and provide some increased alignment for the combination roof ditch sealer dam and molding clip 100 such that roof ditch sealer dam 114 is square with the front end of the rear roof ditch molding.

In operation, the combination roof ditch sealer dam and molding clip 70 is located within the roof ditch 46 and bonded to the vehicle roof 42 using, for example, an adhesive, such as provided by a curable double-sided acrylic tape. The rear roof ditch molding 54 may be placed within the roof ditch 46 and also bonded therein using an adhesive and the front end 76 of the rear roof ditch molding 54 may be interlocked with the molding clip 82 of the combination roof ditch sealer dam and molding clip 70 using the clip engagement projection 88 and the clip members 84 and 86, as described above. The roof ditch sealer dam 72 extends outwardly from the base 80 in the vehicle vertical direction adjacent the front end 76 of the rear roof ditch molding 54. A roof ditch sealer may be applied in paste form to the roof ditch 46. The roof ditch sealer may be self-leveling and flow within the roof ditch 46. The flow of the roof ditch sealer may be dependent, at least in part, on the curvature of the vehicle roof 42 to which it is applied. The roof ditch sealer dam 72 provides a barrier between the front end 76 of the roof ditch molding 54 and the roof ditch sealer. The roof ditch sealer may then be cured to form the cured roof ditch sealer 64. The cured roof ditch sealer 64 and rear roof ditch molding 54 may then be painted along with the rest of the vehicle roof assembly 40 and then baked, which can also cure the adhesive.

The above-described combination roof ditch sealer dam and molding clips include a roof ditch sealer dam that provides a barrier between the roof ditch sealer and the rear roof ditch molding. The roof ditch sealer dam provides the barrier which can provide a stop surface against which the roof ditch sealer can flow and be cured. The roof ditch sealer dam can provide a reliable end stop of the rear end of the cured roof ditch sealer and inhibit overlap between the roof ditch sealer and the front end of the rear roof ditch molding.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a roof assembly comprising a roof having an outer facing surface and a roof ditch that extends below the outer facing surface, the roof ditch extends in a vehicle longitudinal direction between a front windshield and a rear window;
    a rear roof ditch molding located at least partially within the roof ditch at a rear portion of the roof ditch;
    a cured roof ditch sealer extends along a front portion of the roof ditch and rearward in the vehicle longitudinal direction toward the rear roof ditch molding; and
    a roof ditch sealer dam located between a rear end of the cured roof ditch sealer and a front end of the rear roof ditch molding.

2. The vehicle of claim 1, wherein the roof ditch sealer is part of a combination roof ditch sealer dam and molding clip comprising a molding clip that is interconnected with the rear roof ditch molding.

3. The vehicle of claim 2, wherein the combination roof ditch sealer dam and molding clip comprises a planar base located between the molding clip and the roof ditch sealer dam.

4. The vehicle of claim 3, wherein the planar base is located beneath the rear roof ditch molding.

5. The vehicle of claim 4, wherein the combination roof ditch sealer dam and molding clip is adhered to the vehicle roof using an adhesive.

6. The vehicle of claim 4, wherein the roof ditch sealer dam extends outward from a front side of the base.

7. The vehicle of claim 1, wherein the cured roof ditch sealer comprises polyvinylchloride and is applied as a paste.

8. The vehicle of claim 1, wherein the vehicle roof is connected to a side panel at the roof ditch.

9. A method of filling a roof ditch of a vehicle roof assembly, the method comprising:
    positioning a combination roof ditch sealer dam and molding clip within the roof ditch, the combination roof ditch sealer dam and molding clip comprising a roof ditch sealer dam;
    interconnecting a rear roof ditch molding and the combination roof ditch sealer dam and molding clip; and
    applying a roof ditch sealer in the roof ditch, the roof ditch sealer dam providing an end stop for a rear end of the roof ditch sealer.

10. The method of claim 9, wherein the roof ditch sealer dam preventing overlap of the roof ditch sealer and the rear roof ditch molding.

11. The method of claim 9 further comprising curing the roof ditch sealer to form a cured roof ditch sealer.

12. The method of claim 11 further comprising painting the roof assembly with the cured roof ditch sealer, the combination roof ditch sealer dam and molding clip and the rear roof ditch molding in place.

\* \* \* \* \*